WILLOUGHBY & PHELPS.
Coffee Pot.
No. 93,153.
Patented July 27, 1869.
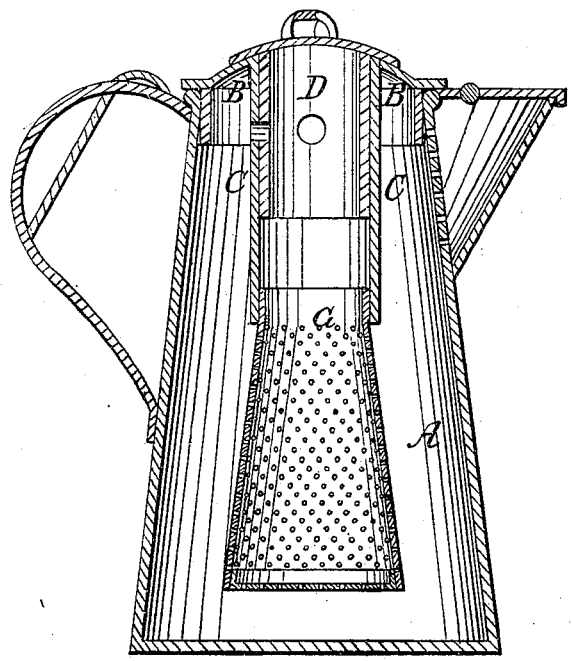
Witnesses,
Hurdy
F. A. Lehmann.
Inventors
O. B. Willoughby
H. G. Phelps
per
Alexander & Mason
Attys.

United States Patent Office.

P. B. WILLOUGHBY AND H. G. PHELPS, OF JUDD, WISCONSIN.

Letters Patent No. 93,153, dated July 27, 1869.

---

COFFEE-POT.

---

The Schedule referred to in these Letters Patent and making part of the same.

---

*To all whom it may concern:*

Be it known that we, P. B. WILLOUGHBY and H. G. PHELPS, of Judd, in the county of Green, and in the State of Wisconsin, have invented certain new and useful Improvements in Coffee-Pots; and do hereby declare that the following is a full, clear, and exact description thereof, reference being had to the accompanying drawings and to the letters of reference marked thereon, making a part of this specification.

The nature of our invention consists the construction of a coffee-pot, and in the arrangement of the devices hereafter shown and set forth.

The accompanying drawing represents a section view of our invention.

Letter A represents an ordinary coffee-pot.

Extending downward from the cover B, is the tube C, the lower part of which is perforated, so as to form a strainer, through which the water flows into the pot A.

This tube is provided with a cover, D, the rim of which extends to some distance downward, and has a number of holes made through it, to correspond with those made through the tube.

The ground coffee is placed in the bottom of the strainer, and as soon as the water has been poured upon it, the cover D is placed on, care being taken that the holes through it and the tube are placed together. As the steam arises from the coffee it will pass through the holes, and then downward as rapidly as it cools, thus preventing all evaporation of the strength, by the steam, and also retaining all the aroma.

Each of the covers has been provided with a handle, so that both together or one at a time can be removed.

Having thus described our invention,

What we claim, and desire to secure by Letters Patent, is—

The combination of the perforated tube C, the lower end of which forms a strainer, the covers B and D, and pot A, when arranged substantially as set forth and described.

In testimony that we claim the foregoing, we have hereunto set our hand, this 20th day of May, 1869.

P. B. WILLOUGHBY.
H. G. PHELPS.

Witnesses:
S. WITMER,
WM. SWAN.